May 5, 1936. M. R. MULFORD 2,039,442

PROCESS AND DEVICE FOR THE HANDLING OF PLANTED SEEDS

Filed April 2, 1935

INVENTOR.
MARION R. MULFORD.
BY Allen & Allen
ATTORNEYS.

Patented May 5, 1936

2,039,442

UNITED STATES PATENT OFFICE 2,039,442

PROCESS AND DEVICE FOR THE HANDLING OF PLANTED SEEDS

Marion R. Mulford, Lebanon, Ohio

Application April 2, 1935, Serial No. 14,280

19 Claims. (Cl. 47—37)

While growing plants have been packaged and shipped with means to preserve the life thereof until the recipient of the shipment can transplant the plants, there has not to my knowledge been any attempt to package and ship seeds in planted condition, nor any realization of the advantages thereof. Hitherto seeds have been shipped by themselves in appropriate packages. It would be a matter of very distinct advantage, however, if seeds in a compact package could be shipped to the user in planted condition, for a number of reasons, among which may be mentioned (1) that the seed house can plant the seeds correctly and in the proper relationship; (2) that it can plant them in prepared and treated earth, requiring only the addition of water for the early stages of germination and growth; (3) that the packaging and shipment of planted seeds permits the early stages of germination and growth to be carried on without inconvenience in a household, or in some other structure which will prevent the unfavorable action of weather conditions upon the seeds in small plants, and so that their growth may be started earlier, and under more favorable conditions than would otherwise be possible, and so that the small plants may be ready for transplanting as soon as external weather conditions permit; (4) I have found that packages can be so arranged as to include not only the earth and seeds in proper relationship, but also means for retaining water and for feeding the water to the earth properly so that the use of these packages of planted seeds is a matter of extreme convenience, and requires no attention excepting the occasional renewal of the water. (5) I have found that packages of planted seeds may be constructed which are small and compact and require very little space; (6) I have found that it is possible in packages such as I will hereinafter describe, to plant seeds in proper relationship in prepared earth, and to ship these to a purchaser without disturbance of the predetermined relationship, all of these conditions coinciding to provide for the seeds the best possible conditions for germination and the initial growth of the plants.

The general objects of my invention, it is believed, will be clear from the foregoing discussion, and other and more specific objects will be set forth hereinafter or will be apparent to one skilled in the art upon reading these specifications. These objects I accomplish by that process and by that construction and arrangement of parts of which I shall hereinafter set forth certain exemplary embodiments; and reference is now made to the drawing, wherein.

Figure 1:
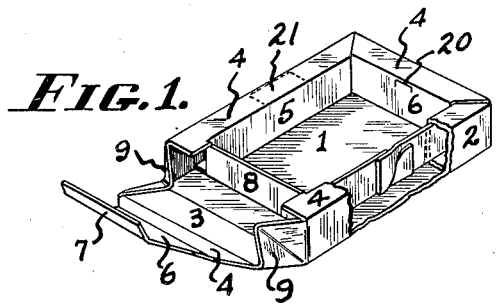
Figure 1 is a perspective view of an exemplary outer container in partially set up condition.
Figure 5:
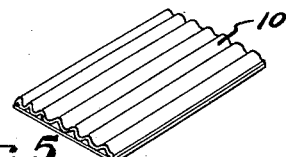
Fig. 5 shows a supporting element.

It is my object, as has been set forth hereinabove, to plant seeds in proper relationship, in properly treated and prepared earth, and to package and ship the planted seeds to a consumer. This implies providing a suitable shipping container to hold the planted earth, and also means to retain the seeds and earth against displacement during shipment, so that they do not lose their pre-arranged positions. In a more advanced aspect of my invention, I contemplate the use of a moisture-proof outer package, and an inner package which is the package of planted seeds aforesaid, there being a spaced relationship between the outer and inner packages for the reception of the water necessary to start the process of germination. In another aspect of my invention, I contemplate the use of a moisture-proof package and planted seeds therein, but with one or more inserts in the package, the purpose of which is not only to help retain the seeds and earth in their predetermined positions, but also to accept and act as a reservoir for water to be used during the germination stage. My invention also contemplates the provision of special ways to maintain the relationship of seeds and earth, as will hereinafter be more fully described. By reference to Figs. 1 to 8, inclusive, I shall now describe an exemplary seed package which is a form preferred by me, by reason of its cheapness and convenience. This form employs an inner, non-waterproofed container for the earth and seeds, and an outer container of water-resistant construction and having parallel, interspaced walls, providing a reservoir for water. I shall not particularly describe the blanks of boxboard from which the cartons are made, these being the invention of Harry Z. Gray, and set forth in a copending application, Ser. No. 13,121, filed March 26, 1935, which application has been assigned to me, with rights in said Gray for uses not connected with horticulture. As shown in Figure 1, the outer carton comprises a bottom member 1, outer, side and end wall members 2 and 3, spacing members 4, inner side and end wall members 5 and 6, and if desired, spacing flap members 7. This outer carton is preferably set up around an inner collar member 8, so that the inner and outer side and end wall members assume the interspaced relationship clearly shown in Fig. 1. The outer side and end wall members are connected by bellows-fold portions 9, so that the outer portions of the carton form a water-tight tray. The carton may be made of any suitable moisture retaining board. Paraffined board will be found adequate. A bottom filler member 10 in Fig. 5 may be placed in the space between the inner side and end walls, and serves to hold the lower portions of these walls in proper relationship against the collar 8. It also serves to stiffen the bottom of the structure, and to form conduit means whereby water from the reservoir between the inner and outer walls may be conducted to the inner package, by capillarity or otherwise.

Figure 2:
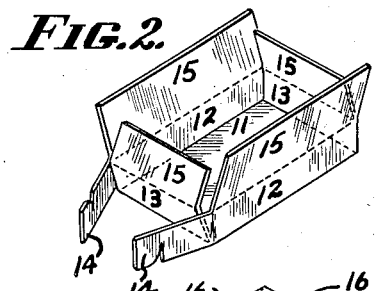
Fig. 2 is a perspective view of an exemplary inner container in partially set up condition.
Figure 4:
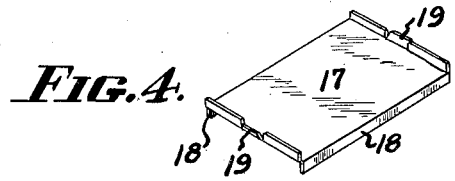
Fig. 4 shows an exemplary top closure for the outer container.

A suitable inner package is shown in partially set up condition in Fig. 2, where there is a bottom 11, side walls 12, end walls 13, locking flaps 14 to maintain the carton in set up condition, and top closure flaps 15. It is a matter of convenience to articulate the top closure flaps 15 to the side and end walls by means of lines of perforations or other weakened lines formed in the carton blank, so that in use these flaps may readily be removed, or, if desired, a section of the bottom wall may similarly be made removable, as set forth in the application of said Gray.

Figure 3:
Fig. 3 shows the inner container closed.

In the practice of my invention, I take a carton such as that illustrated in Fig. 2 and place in it earth of known characteristics which has been sterilized, and which has, if desired, been mixed with proper plant food substances to promote the germination of seeds, and the growth of plants. Then the seeds are planted therein in a desired, predetermined arrangement determined by the nature of the seeds themselves. This may be done in any one of a large number of ways, which do not require description. The carton of Fig. 2 will be filled with earth, with seeds planted therein, and may then be closed by folding over the flaps 15 and sealing, as by means of tape 16, as shown in Fig. 3, or otherwise, as desired.

Figure 6:
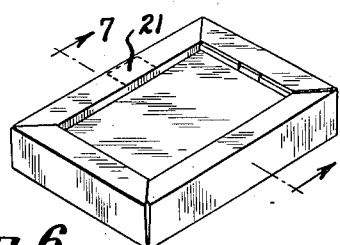
Fig. 6 is a perspective view of the completed and closed package.

It is intended that this inner carton be placed in the outer carton on the supporting pad 10. This pad will stiffen the side of the container folding thereagainst, and tend to prevent displacement of the earth. Under some circumstances, it may be found advisable to place into the inner carton on the opposite side, such as the top thereof, an additional pad or board, or the like, or a wadding of fibrous material, or both, to prevent the displacement of the earth. When the inner container has been placed in the outer container, a cover 17, such as that shown in Fig. 4, may be placed into the outer container as shown in Fig. 6. Side flanges 18 serve to stiffen this cover, and there are locking tongues 19 to engage with locking means 20 in the outer carton. The cover 17 may bear such display or advertising material as may be required. The organization of parts is clearly set forth in the sectional view of Fig. 7, where like numerals indicate like elements.

In use, the purchaser of a package such as this will remove the cover 17 and will open the inner container by removing the tape 16 and tearing off the flaps 15. Then the purchaser will pull up a perforated flap 21 in the outer container. This flap gives access to the space between the inner and outer walls of the outer container; and the purchaser will pour water into this space. The water will be held by the outer container, but will seep into the inner container, as will be clear, will moisten the earth and will start the germination of the seeds. When the small plants 22, indicated in Fig. 8, have grown to the proper size, the package will have served its usefulness and the plants will be taken therefrom and transplanted into a plot of ground which has been prepared for them.

Figure 9:
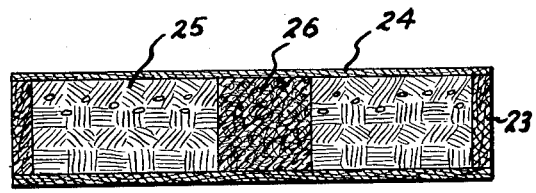
Fig. 9 is a sectional view through a modified form of package.

My invention is not restricted as has hereinabove been set forth, to any particular type of package, such as that which I have just described. I have indicated, for example, in Fig. 9, a container 23, preferably of stiff material. Wood, blown pulp, paper or tin cans and the like are exemplary of materials which may be used. The container has a cover 24, also of stiff material. Earth and seeds indicated at 25 may be placed therein, and the stiffness of the container will serve to maintain their predetermined relationship. The container, if non-waterproof, may be placed by the user in a pan of water for germination, or if the container is water-proof, means may be provided acting as a storage reservoir for water therein. I have shown in Fig. 9 a centrally located pad 26, which may be of fibrous material, or of sponge rubber, or the like. This pad, by its resiliency, may serve to help retain the earth and seeds in their predetermined positions, and also to accept water, act as a reservoir therefor, and feed the water as required to the earth. I have shown this pad as centrally located, but it may likewise be peripherally located, or there may be in any one package a number of such pads.

Figure 10:
Fig. 10 shows a seed spacing means useful in the practice of my invention.
Figure 7:
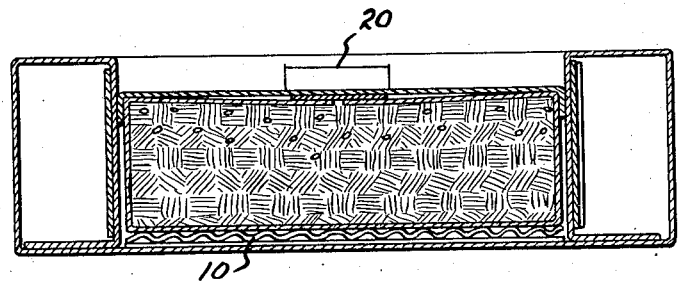
Fig. 7 is a sectional view therethrough, along the lines 7, 7 of Fig. 6.
Figure 8:
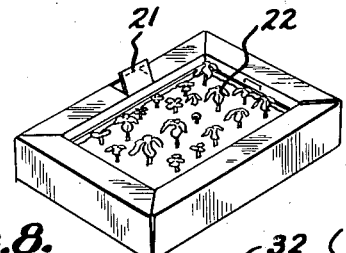
Fig. 8 shows the package of Fig. 6 in use.
Figure 11:
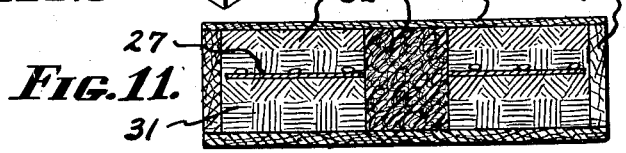
Fig. 11 is a sectional view through an exemplary package showing the use of the seed holding means of Fig. 10.

To facilitate shipment under conditions where the retention of loose earth and seeds is difficult, or where stiff containers are not available, or where it is not desired to provide containers with packing pads or other equivalents as hereinabove described, my invention also contemplates various means for retaining the seeds in proper planted position. Thus it will be possible to take prepared and treated earth, and either before or after planting the seeds therein, cause the earth to be caked together so as to have a self-sustaining structure of its own. Preferably for this purpose a binder will be used. Such binder may comprise any substance not having a deleterious effect upon the germination or growth of plants, said substance being of a nature to act as a binder when dry, but soluble or otherwise disintegrable upon the addition of water, so that during the germination and growth period its binding characteristics will be lost. Again, it is possible to provide means for maintaining a predetermined relationship of the seeds, irrespective of some movement in the loose earth in which they are packed. I have illustrated in Fig. 10 one such means comprising a piece of paper 27, to which seeds 28 have been attached by a slight amount of non-deleterious adhesive. The paper is preferably a paper of light structure susceptible of weakening or disintegration under the action of water. If a stronger paper is preferred, the paper may be perforated at intervals to permit portions of the plants to pass therethrough. I have illustrated in Fig. 11 a container 29, having a top 30 and layer of earth 31 therein. The paper member 27 has a layer of earth 32 thereabove. The paper may, if desired, be perforated for the passage of the packing member 33, serving as a water reservoir. It will be clear that the paper will retain the seeds in proper position in spite of considerable movement in the earth portions 31 and 32.

It will be clear that modifications may be made in my invention without departing from the spirit thereof.

Having thus described my invention, what I claim as new and desire to secure by Letters Patent, is:—

1. A package for seeds comprising earth, seeds planted in predetermined relationship therein, a container for said earth, means for holding said seeds and earth in predetermined relationship during the shipment of said package, and means in connection with said container for maintaining a body of water in contact with said earth.

2. In a package, earth, seeds planted in said earth in predetermined relationship, a container for said earth, a closure for said container, and resilient means exerting pressure on said earth to retain said earth and seeds in predetermined relationship during the shipment of said package.

3. In a package, earth, seeds planted in said earth in predetermined relationship, a container for said earth, a closure for said container, and resilient means exerting pressure on said earth to retain said earth and seeds in predetermined relationship during the shipment of said package, said resilient means being water penetrable and serving as a reservoir for the water necessary to the germination of said seeds.

4. In combination in a shipping package, earth, seeds planted therein in predetermined relationship, a container which is moisture resistant, and means for holding within said container a body of water accessible to said earth and seeds.

5. In combination in a shipping package, an outer water-proof container and an inner non-water-proof container, earth in said inner container, seeds planted in said inner container and a closure for said inner container, said closure being removable to permit germination of said seeds in said package upon the addition of water to said outer container.

6. In combination in a shipping package, an outer water-proof container and an inner non-water-proof container, earth in said inner container, seeds planted in said inner container and a closure for said inner container, said closure being removable to permit germination of said seeds in said package upon the addition of water to said outer container, and means for exerting pressure on said inner container to retain said seeds and said earth in predetermined relationship during shipment thereof.

7. In combination in a package, a container, earth in said container, seeds planted in predetermined relationship in said earth, and means for binding said earth together to prevent displacement thereof during shipment of said package.

8. In combination in a package, a container, earth in said container, seeds planted in predetermined relationship in said earth, means for binding said earth together to prevent displacement thereof during shipment of said package, said means comprising a water soluble binder for said earth.

9. In combination in a shipping package, a container, earth in said container, seeds planted in said earth, and means in said earth for maintaining a predetermined spaced relationship both vertical and horizontal of said seeds therein during shipment of said package.

10. In combination in a shipping package, a container, earth in said container, seeds planted in said earth, and means for maintaining a predetermined spaced relationship of said seeds therein during shipment of said package, said means comprising supporting means for said seeds adapted to retain the position of said seeds in spite of sporadic movements of said earth.

11. In a shipping package, a container, a sheet of material adapted to be weakened by the action of water, seeds fastened to said sheet, earth in said container, said sheet being embedded in said earth.

12. In a shipping package, a container, a sheet of material adapted to be weakened by the action of water, seeds fastened to said sheet, earth in said container, said sheet being associated with said earth, said sheet being substantially co-terminous with the interior side walls of said container.

13. In a shipping package, a container, a sheet of material adapted to be weakened by the action of water, seeds fastened to said sheet, earth in said container, said sheet being embedded in said earth, said sheet being substantially co-terminous with the interior side walls of said container, said container having a removable closure to permit germination of said seeds in said container.

14. In a shipping package, a container, a sheet of material adapted to be weakened by the action of water, seeds fastened to said sheet, earth in said container, said sheet being embedded in said earth, said sheet being substantially co-terminous with the interior side walls of said container, said container having a removable closure to permit germination of said seeds in said container, and means in connection with said container for retaining a supply of water in contact with said earth.

15. In combination, a container, earth in said container, a sheet of supporting substance for seeds also in said container, seeds fastened in predetermined relationship to said sheet, water reservoir means in said container, said sheet being cut away to permit the passage of said reservoir means, and a removable closure for said container.

16. A process of shipping seeds, which comprises providing a container, introducing seeds and earth into said container in predetermined relationship, closing said container, and providing means externally acting on said container for maintaining during the shipment thereof said predetermined relationship of said seeds and earth.

17. A process of shipping seeds, which comprises providing a container, introducing seeds and earth into said container in predetermined relationship, closing said container, and providing means for maintaining during the shipment thereof said predetermined relationship of said seeds and earth, said means comprising in part at least resilient means providing a reservoir for water.

18. In combination, a flexible container, seeds and earth in said container in a predetermined relationship, and means pressing on said container for maintaining said predetermined relationship of said seeds and earth during shipment.

19. In combination, a flexible container, seeds and earth in said container in a predetermined relationship, and external means pressing inwardly on said container for maintaining said predetermined relationship of said seeds and earth during shipment.

MARION R. MULFORD.